US012687134B2

(12) United States Patent
Van Den Hende et al.

(10) Patent No.: US 12,687,134 B2
(45) Date of Patent: Jul. 21, 2026

(54) METHOD OF CONTROLLING FUEL INJECTION

(71) Applicant: PHINIA DELPHI LUXEMBOURG SARL, Belvaux (LU)

(72) Inventors: Stéphane Van Den Hende, Marolles (FR); Eric Charleux, Vineuil (FR)

(73) Assignee: PHINIA DELPHI LUXEMBOURG SARL, Belvaux (LU)

( * ) Notice: Subject to any disclaimer, the term of this patent is extended or adjusted under 35 U.S.C. 154(b) by 5 days.

(21) Appl. No.: 18/849,190

(22) PCT Filed: Mar. 20, 2023

(86) PCT No.: PCT/EP2023/057087
§ 371 (c)(1),
(2) Date: Sep. 20, 2024

(87) PCT Pub. No.: WO2023/180250
PCT Pub. Date: Sep. 28, 2023

(65) Prior Publication Data

US 2025/0198360 A1 Jun. 19, 2025

(30) Foreign Application Priority Data

Mar. 21, 2022 (GB) ...................................... 2203930

(51) Int. Cl.
*F02D 41/40* (2006.01)
*F02D 19/02* (2006.01)
(Continued)

(52) U.S. Cl.
CPC ........... *F02D 41/401* (2013.01); *F02D 19/02* (2013.01); *F02D 41/20* (2013.01); *F02D 41/24* (2013.01)

(58) Field of Classification Search
CPC ........ F02D 41/401; F02D 19/02; F02D 41/20; F02D 41/24
See application file for complete search history.

(56) References Cited

U.S. PATENT DOCUMENTS

| | | | |
|---|---|---|---|
| 2018/0030912 A1 | 2/2018 | Hauser et al. | |
| 2019/0242322 A1 | 8/2019 | Chia et al. | |
| 2021/0148297 A1* | 5/2021 | Baur | F02D 41/20 |

FOREIGN PATENT DOCUMENTS

| | | | |
|---|---|---|---|
| DE | 102007045575 A1 * | 4/2009 | F02D 41/20 |
| DE | 102015206729 A1 | 10/2016 | |

(Continued)

OTHER PUBLICATIONS

International Search Report for PCT/EP2023/057087 dated Jul. 14, 2023, 4 pages.

(Continued)

*Primary Examiner* — Syed O Hasan
(74) *Attorney, Agent, or Firm* — WARNER NORCROSS + JUDD LLP

(57) ABSTRACT

A method of controlling fuel injection in an internal combustion engine having at least one cylinder with an associated electrically actuated fuel injector for performing injection events, wherein a drive signal is applied to the fuel injector in order to actuate a needle therein that controls flow through a valve seat. The drive signal comprises a fueling pulse adapted to move and/or hold the needle to an open position relative to a valve seat, followed by a braking pulse adapted to slow down the needle moving towards a closed position relative to the valve seat, the braking pulse being separated from the fueling pulse by a separation period. The braking pulse is configured to end at a timing that substantially matches the moment when the needle reaches the closed position.

17 Claims, 3 Drawing Sheets

(51) Int. Cl.
*F02D 41/20* (2006.01)
*F02D 41/24* (2006.01)

(56) References Cited

FOREIGN PATENT DOCUMENTS

| | | | | | |
|---|---|---|---|---|---|
| DE | 102015207274 | A1 | * | 10/2016 | ............. F02D 41/40 |
| DE | 102016219890 | B3 | | 8/2017 | |
| GB | 2552516 | A | * | 1/2018 | ............. F02D 41/20 |
| WO | 2011138127 | A1 | | 11/2011 | |
| WO | 2015071686 | A1 | | 5/2015 | |
| WO | 2016188726 | A1 | | 12/2016 | |
| WO | WO-2019201789 | A1 | * | 10/2019 | ............. F02D 41/20 |

OTHER PUBLICATIONS

Machine assisted English translation of DE102015207274A1 obtained from <https://patents.google.com/patent> on Sep. 16, 2024, 7 pages.
Machine assisted English translation of WO2011138127A1 obtained from https://patents.google.com/patent on Sep. 16, 2024, 12 pages.
Machine assisted English translation of WO2016188726A1 obtained from https://patents.google.com/patent on Sep. 16, 2024, 7 pages.

* cited by examiner

METHOD OF CONTROLLING FUEL INJECTION

CROSS-REFERENCE TO RELATED APPLICATIONS

This application is the U.S. National Stage of International Application No. PCT/EP2023/057087 filed on 20 Mar. 2023, which claims priority to and all advantages of United Kingdom Application No. 2203930.9 filed on 21 Mar. 2022, the contents of which are incorporated herein by reference.

FIELD OF THE INVENTION

The present invention generally relates to fuel injection control and more specifically to methods of controlling fuel injection via actuation of fuel injectors. It has particular but not exclusive application to internal combustion engines operating with gaseous fuels.

BACKGROUND OF THE INVENTION

Solenoid or piezo-electric actuated fuel injectors typically are controlled by pulses sent to the actuator of a fuel injector which act to open a fuel injector valve and allow fuel to be dispensed. Such actuators act to displace (via the armature of the actuator) a needle arrangement of the valve to move the needle away from a valve seat. In such a state the valve is open and when the pulse falls there is no power to the actuator and the valve is forced to a closed position.

Pulse profiles may vary and may comprise a series of phases to operate the solenoid. There may be an initial activation phase, provided in order to start to move the needle away from the valve seat, thereafter the current and thus power to the actuator is reduced. After a short while this may be followed by a hold phase where a reduced level of power is applied to keep the valve in the open position. This pulse may be regarded as fueling pulse. Thereafter the current is cut to stop magnetic forces and allow the needle to close the valve under the action of a strong spring. The lighter the fuel is (gases), the stronger the spring to avoid leakage.

In this last phase the needle is strongly accelerated to reach its closed position and hits its seat with a high kinetic energy that can create noise, damage the seat and deteriorate injector performance. Indeed injectors are actuated several hundreds thousands up to billions of times during engine lifetime. This causes wear of injector body parts around the seat. Furthermore, some fuels such as gases (CNG, hydrogen . . . ) have almost no lubricating power which worsens the situation.

GB2552516A discloses a fuel injection strategy using a braking pulse to slow down the needle in the closing phase. The method comprises the steps of detecting whether a valve reopening event occurs and change accordingly the setting of the braking pulse. This method may however be difficult to implement under some operating conditions, because re-opening detection is not easy. Furthermore, injector reopening, required in the method of GB2552516A, is something that should ideally be avoided, since it implies additional emissions and may lead to engine control issues.

OBJECT OF THE INVENTION

The object of the present invention is to provide an improved injection control strategy implementing braking pulses, that does however not require detection of injector reopening.

This object is achieved by a method of controlling fuel injection as claimed in claim 1.

SUMMARY OF THE INVENTION

The present invention relates to a method of controlling fuel injection in an internal combustion engine having at least one cylinder with an associated electrically actuated fuel injector for performing injection events, wherein, for an injection event a drive signal is applied to the fuel injector in order to actuate a needle therein that controls flow through a valve seat.

The drive signal comprises a fueling pulse adapted to move and/or hold the needle to an open position relative to a valve seat, followed by a braking pulse adapted to slow down the needle moving towards a closed position relative to the valve seat. The braking pulse is separated from the fueling pulse by a separation period.

According to the invention, the braking pulse is configured to end at a timing that substantially matches the moment when the needle reaches the closed position. Stated otherwise, the braking pulse is configured to end at a timing that substantially coincides with a closing time of the injector.

The present inventors have found that the maximum efficiency of a braking pulse can be obtained when the braking pulse is applied at the end of the needle movement, precisely when the end of the braking pulse coincides with the moment the needle lands on the valve seat in closed position. The present strategy allows slowing down the needle velocity at impact with the seat, while minimizing effects on closing delay.

The inventive method has been particularly developed for controlling fuel injection in engines operating on hydrogen fuel, but can be used with other gaseous fuels as well as liquid fuels.

The present fuel injection method is typically implemented in a normal engine operating mode, i.e. such that the injection events comprise a braking pulse as prescribed herein. The method is however particularly desirable with large fueling pulses. That is, the normal operating method may be switched on from a certain fuel demand (beyond ballistic pulses). Or conversely the braking pulse may be disabled if the injected fuel quantity is too low. Indeed, in such situation of ballistic or small pulses the needle speed at closing is naturally reduced and there may be no need to slow the needle down.

As used herein, 'closing time' refers to the timing at which the needle finishes its closing move (coming from the open position) and reaches its 'closed position' wherein it blocks the flow through the injector valve seat. The needle may close the valve seat directly or indirectly. Direct closing refers to the case where the needle end has a sealing surface that comes into direct contact with the valve seat; the closing time is thus the moment the needle lands on the valve seat. Indirect closing refers to the case where the needle actuates an obturating member, e.g. a ball, situated between the needle end and the valve seat.

The fueling pulse is a pulse that is designed to open the injector and cause fuel injection. One engine cycle may include one or more fueling pulses, depending on the injection strategy. The fueling pulses are generally defined by the ECU on the basis of fuel demand.

The separation period is the time period between the end of the fueling pulse (or last fueling pulse) and the beginning of the braking pulse.

In practice, it is acceptable that the braking pulse ends within +/−100 μs, preferably within +/−50 μs of the moment when the needle reaches the closed position (closing time).

In embodiments, the method may be implemented on the basis of a nominal closing time. That is, the reference closing time may be a value that is statistically representative of an injector population (for a given make/model).

It should however be noted that the closing time is a parameter that can be measured during engine operation. The closing time can e.g. be determined/derived from the voltage trace measured across the solenoid actuator of the fuel injector. Various methods are known in the art.

In embodiments, the closing time may be learned during engine runtime, for each injector. The separation period may thus be updated on the basis of the learned closing time. This allows taking part-to-part variation between injector, and hence improving the injection strategy.

In embodiments, the needle closing time is learned during a learning mode, during which the drive signal does not include a braking pulse.

In embodiments, the breaking pulse has a predetermined energy calibrated in function of a respective engine operating point (speed/load). For example, the breaking pulse may have a predetermined duration read from a map in function of fuel pressure and flow rate. Additionally or alternatively, the breaking pulse may have a predetermined current intensity read from a map in function of fuel pressure.

The separation period may be read from a map in function of fuel pressure and flow rate.

The needle closing time may be read from a map in function of fuel pressure and flow rate.

In general, the braking pulse energy may be determined by optimizing to reach a desired target closing speed for a respective operating point with the lowest increase of needle closing time and lowest energy.

In embodiments, the duration of the separation period is determined by a positioning routine comprising:

- for a given operating point, performing a plurality of injection events while increasing the separation period; and
- selecting the optimal value of separation period based on the analysis of the voltage trace corresponding to each drive pulse.

Based on such positioning routine, a characteristic parameter may be derived from the voltage trace and used for selecting the optimal value of separation period, the characteristic parameter reflecting the needle closing time.

In embodiments, the optimal separation period may be determined by comparison to a threshold.

In embodiments, the characteristic parameter may be a glitch magnitude. The optimal separation period may be determined based on a drop in glitch magnitude.

According to another aspect, the invention also relates to an injection control unit configured to perform the steps of the method of controlling fuel injection as disclosed herein.

BRIEF DESCRIPTION OF THE DRAWINGS

The present invention will now be described, by way of example, with reference to the accompanying drawings, in which.

DETAILED DESCRIPTION OF PREFERRED EMBODIMENTS

Embodiments of the invention are described below. The invention relates to the control of fuel injection/fuel injectors in an internal combustion engine—not shown. As is known, fuel is typically dispensed from a fuel tank to a fuel rail fluidly connecting the fuel therein to a series of injectors. The injectors typically include a solenoid or piezo-electric actuator to control a valve assembly, typically a needle (or pintle) arranged to reciprocate in an axial bore in a nozzle portion of the fuel injector, so as to open, respectively close a seat at the tip of the nozzle portion, through which fuel is dispensed into the engine (combustion chamber).

When energized, the actuator acts to displace (generally via an armature member of the actuator) the needle of the valve assembly to move the needle away from the valve seat. In such a state the valve is open. When the supply of power to the actuator stops, the needle is forced toward the seat to bring the valve assembly in closed position.

The fuel injection timing is typically controlled by the Engine control unit ECU which determines the control signals required to generate injection events for injecting fuel and defines the injection parameters. The method of the present disclosure has been developed for application to fuel injection systems operating on gaseous fuels such as $H_2$ or CNG, but is applicable to engines other fuels, e.g. gasoline or diesel, biofuel, etc.

Figure 1:
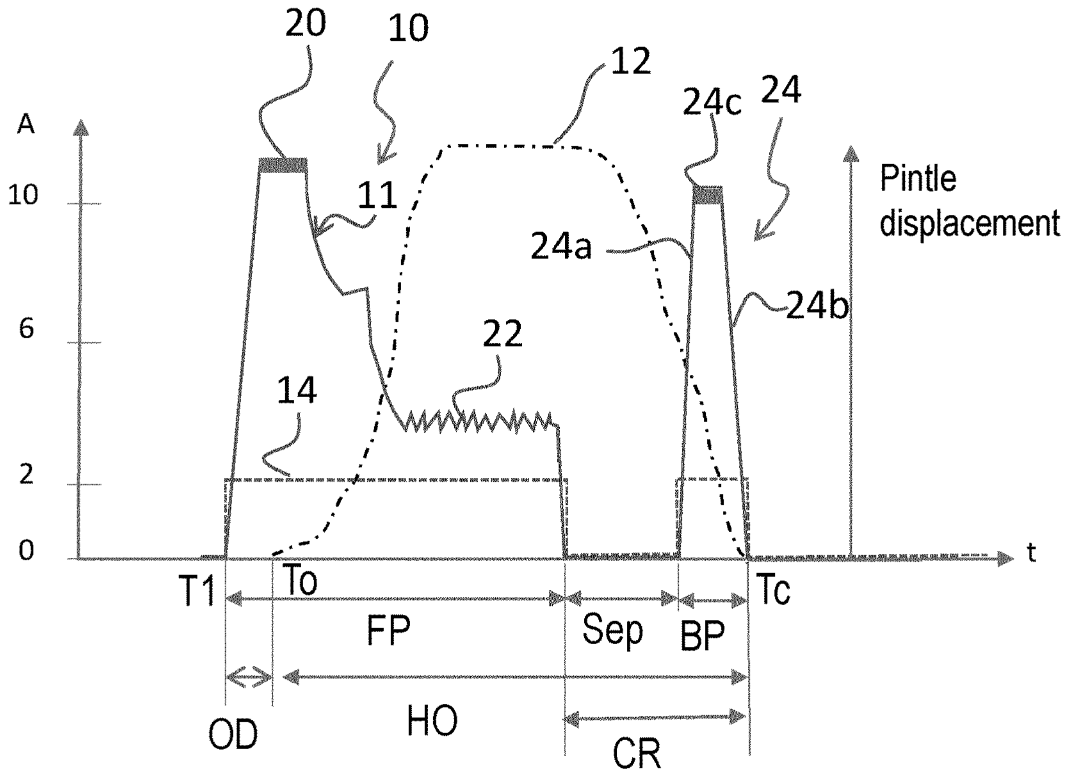
FIG. 1: is a graph illustrating injector current, needle displacement and drive signal vs. time.

FIG. 1 shows a principle plot of the characteristics of the drive current 10 across the solenoid actuator against time during an injection event/cycle, which is consequent to the also illustrated command signal 14. The plot also shows the corresponding needle displacement 12 (also referred to as needle pulse).

This command signal 14 is determined by e.g. the ECU or injector controller as a result of the fuel demand, and in a simple example comprises a single pulse of variable length; the variable which is set is thus the length of the pulse which determines essentially how long a fuel injector valve is to be opened, and hence determines the corresponding amount of fuel to be dispensed.

The applied current across the injector is based on the command signal 14 and may comprise a series of pulses/phases which will be described hereinafter. It is to be noted that for a particular command signal 14 different voltage profiles may be applied to the actuator (e.g. solenoid), according to design strategy. It is to be further noted that the current trace measured across a solenoid actuator will be somewhat influenced by the movement of the valve/solenoid actuator by virtue of induced current/voltage.

As can be seen on FIG. 1, once injector command 14 is received, a fueling period FP is first operated, where a fueling pulse 11 is applied to the actuator. The fueling pulse 11 has a profile with different phases. In a first phase 20 (pulling phase) a relatively high initial pulse current 20 is applied to the actuator in order to actuate it, which causes the needle to start moving and the needle to move away from the valve seat. The needle is accelerated and starts to move rapidly. After a short while as the needle starts to move, the drive pulse (current) is reduced (bypass current) and a short time after this when the needle reaches maximum displacement, the drive pulse is decreased to a relatively low level called the "hold" phase 22. This is maintained for a set time and then the current pulse is reduced to zero once the fueling command is inactive, and the armature/needle is forced (by a return spring) to move back in the opposite direction to close the valve. The period between the start of the first phase 20 and the end of the second phase 22, corresponding here to a single fueling pulse 11, is referred to as the fueling period noted FP in the figure. Aspects of the invention are not limited to such profiles and the term "fueling period" may be regarded as the time period from the start of a first fueling pulse to activate the solenoid actuator to the time after the last activation/fueling pulse when the current is reduced to zero, less or substantially close to zero.

A braking pulse 24 is advantageously applied—subsequent to the fueling pulse(s)—during the needle closing stroke to control its speed and preferably achieve a soft landing of the needle. The braking pulse 24 may thus be referred to as 'Soft Landing Pulse'. The braking pulse 24 is applied during the braking period BP.

To achieve lowest closing speed, the braking pulse 24 provides a counterforce, carefully controlled to provide a balanced condition.

There is an inter-pulse delay, referred to as "separation period" or Sep that is defined as the time between the end of the last fueling pulse 11 and the start of the braking pulse 24 and is shown by arrow Sep.

One may also note in FIG. 1 the conventional designation of the various operating phases of the injector. The time period between the start of the fueling pulse 10 (at $T_1$) and the moment ($T_O$) the needle starts moving is the Opening Delay, OD. The time period during which the needle is raised from the seat and fuel can actually be dispensed is called hydraulic opening, HO. The time period between the end of the fueling pulse 10 and the moment ($T_C$) the needle lands on the valve seat (closed position) is called closing response CR. $T_C$ is thus the closing time.

In the present method, the braking pulse 24 is configured such that it terminates at the moment when the needle reaches the closed position. In FIG. 1, the braking pulse 24 has a simple rectangular wave shape, with a raising edge 24*a*, a width/duration 24*c*, and a falling edge 24*b*. Hence in accordance with the present embodiment, the falling edge 24*b* ends its decrease (current=0) at a timing that substantially corresponds to timing $T_C$. In practice it is desirable that the braking pulse ends within ±100 μs or less from $T_C$, preferably within ±50 μs or less from $T_C$.

In practice, the rectangular current shape of the braking pulse may be obtained by a boosted voltage period at start of braking pulse, and a reverse voltage period at end of braking pulse.

By definition, the braking pulse 24 comes after the fueling pulse 10 (after the fueling period FP) and the separation period Sep defines the time interval between these.

In the method, the time interval Sep, is a control parameter that allows positioning the braking pulse 24 relative to $T_C$.

Referring to the nomenclature of FIG. 1, the control strategy is established such that, from a time perspective:

$$FP + Sep + BP \approx T_C - T1$$

The closing time $T_C$ is a parameter that can be measured for a given injector model and series. A statistically representative value of closing time, referred to as nominal closing time ($T_{C,N}$), may thus be determined as reference value for an injector population. One may thus determine/calibrate the length of Sep on the basis of the nominal closing time and in consideration of the respective FP and BP.

The closing time is preferably learned for each injector during engine operation. A learning routine is therefore performed, from time to time, by which injection events are performed with the nominal fueling pulses, however without including the braking pulse. In doing so, the base closing time of the injector valve assembly, i.e. without being altered by the effect of the braking pulse, is learned.

This closing time without braking pulse is referred to as learned closing time $T_{C,L}$. $T_{C,L}$ may then be used as reference for synchronizing the braking pulse. Since the braking pulse will slightly modify the closing time, a target closing time can be computed by adding an offset: $T_{C,T}=T_{C,L}+$ offset1.

Figure 2:
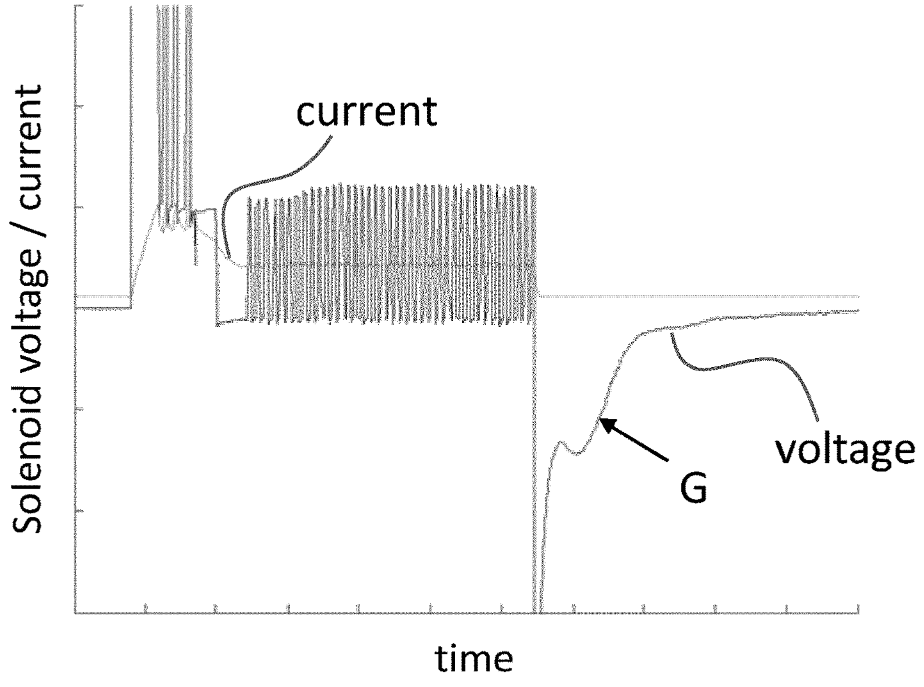
FIG. 2: is a plot of voltage (across the injector solenoid) vs. time.

As indicated above, the injector closing time can be determined from the injector voltage trace during a time window following the end of the fueling pulse. As is known in the art, the needle stoppage in the nozzle seat can be observed as a temporary flattening of the waveform of the decaying voltage, referred to as glitch, indicated G in FIG. 2. Observation of this range in real time, through control of the derivative of the voltage waveform dU/dt, enables determination of the actual time of the needle landing on the valve seat. Other determination strategies, based on the second derivative or other, may also be implemented to determine the closing time.

As will be understood by those skilled in the art, the braking pulse is typically characterized by its energy, which depends on the duration and current intensity of the braking pulse (see below). In this embodiment, the energy of the braking pulse is mapped for a variety of operating points. The maps are calibrated in the factory for a given engine design.

For example, the method uses a map MAP_BPcurr(P), where the current intensity (Amps) of the braking pulse is mapped versus fuel pressure. The method also uses a map MAP_BPd(P, Q) where the time length of the braking pulse is mapped versus pressure and fuel quantity (also referred to as fuel rate).

The inter-pulse delay Sep is also preferably mapped in MAP-Sep(P, Q) in function of pressure and fuel rate. MAP-Sep is calibrated in the factory in consideration of the corresponding fueling pulses and braking pulses, and based on the nominal closing time. In the vehicle, a map MAP-_Trim is stored that maps the nominal closing time and a trim value (Sep.trim) in function pressure and fuel rate. The trim value represents the difference between $T_{C,N}$ and the learned closing time $T_{C,L}$.

During engine runtime, in normal operation mode, an injection event is thus performed to comprise a fueling pulse and a braking pulse, the properties of which are looked up from the tables MAP-BP_curr, MAP-MBd and MAP-Sep. The value of Sep to be used during the combustion event is read from MAP_Sep and corrected with the corresponding Sep.trim value.

Second Embodiment

In another embodiment, the method involves a closed loop routine, referred to as positioning routine, to adjust the separation period Sep between the fueling pulse and braking pulse.

For this learning routine, the braking pulse is initially positioned at a predetermined base SEP value for a given operating point (pressure, fuel rate), and injection events (with braking pulse) are performed iteratively over a range of SEP values.

For each injection event of the learning routine, a characteristic parameter is derived from the measured voltage trace, which reflects the needle closing time.

In this embodiment, the characteristic parameter is the voltage glitch that occurs at needle closing. The voltage glitch can be determined by processing the measured voltage trace with mathematical functions. As will appear to the skilled person, these mathematical functions may be empirical, but derivative functions have been used in the past, in particular first and second derivatives, generally combined with some smoothing/filtering. The greater the impact speed of the needle on its seat, the greater the effect on the voltage trace. The closing time is thus typically the timing corresponding to the local maximum of the derivative function applied to the voltage trace. One parameter that may be of interest is the value of this local maximum, which may be referred to as glitch magnitude (or amplitude). In other words, whereas the timing of the Glitch corresponds to $T_C$, the amplitude of the Glitch reflects the intensity of the impact.

In embodiments, the measured voltage trace is subtracted to a reference voltage trace, and a derivative function is applied once, preferably twice, to determine the glitch timing, i.e. $T_C$ and the corresponding glitch magnitude is also determined/stored.

Figure 3:
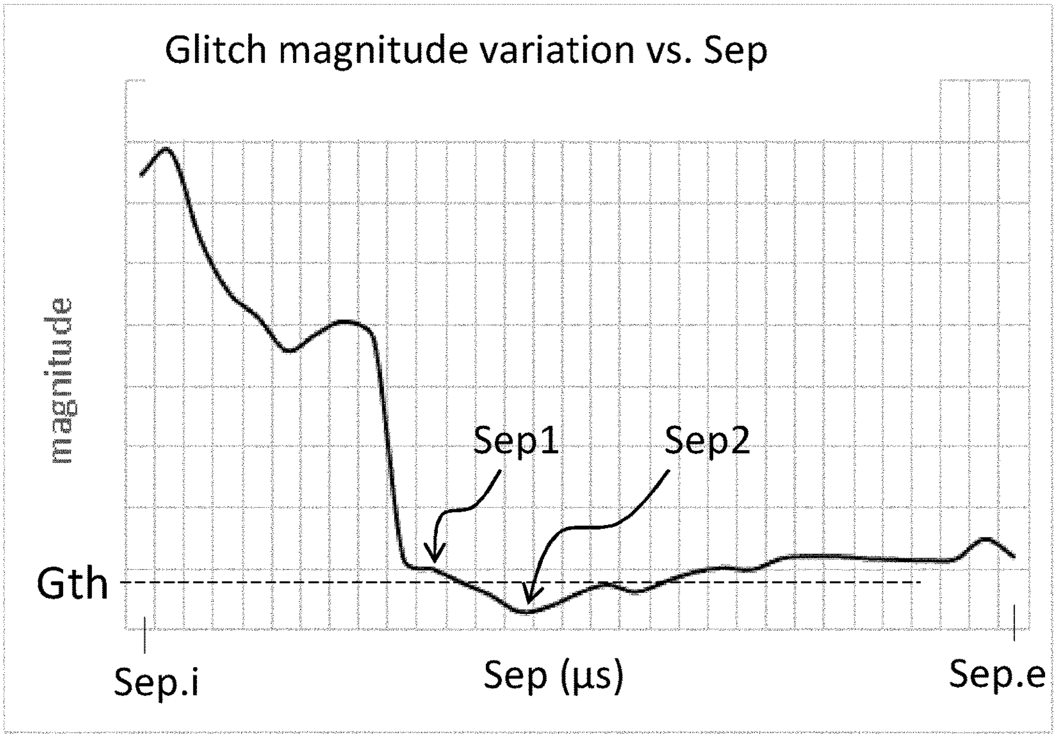
FIG. 3: is a graph of the glitch magnitude vs. separation time Sep.

FIG. 3 is a plot of glitch magnitude vs. Sep. As can be seen, as the separation period Sep increases, the glitch magnitude decreases and for a certain value of Sep a large drop of glitch magnitude can be observed. Indeed, as the separation Sep comes closer to the optimal position, the needle velocity drops, thereby leading to a corresponding drop in glitch amplitude.

This characteristic behavior is advantageously used to adjust the separation period SEP.

In a first approach, the positioning routine can be initiated at an initial Sep value corresponding to Sep.nom minus a certain offset. Injection is thus performed by iteratively increasing the Sep value over a predetermined range (calibrated to see the decrease in the glitch magnitude).

The optimal Sep (Sep.opt) can be defined on the basis of the acquired data, matching a given rule confirmed by experimentation. For example, Sep.opt can be the first Sep point following the point with largest decrease gradient. This point is indicated Sep1 in FIG. 3.

Alternatively, the starting point may be set as Sep.nom plus a certain offset, defined to exceed the optimum. The positioning routine then involves performing injections iteratively while decreasing the current Sep over a given range. Here the idea is to reduce the Sep until the glitch reappears.

Another option is to set the optimal point is to compare the data to a threshold, noted $G^{TH}$, whereby the first point below the threshold is set as Sep.opt.

Still another possibly could be to define Sep.opt as the minimum of the curve of FIG. 3, i.e. point Sep2.

The optimal Sep value identified by means of the positioning routine is then used in the normal mode (i.e. Sep is updated with the optimal Sep value).

<Braking Pulse Calibration>

The braking pulse energy is calibrated for a given injector operating point (fuel pressure, fuel flow rate).

The braking pulse 24 preferably has a simple and short waveform, as shown in FIG. 1. Its energy is characterized by its duration and current intensity. The energy of the braking pulse has an impact on the closing speed and on the closing time. The higher the energy the lower the speed at closing for optimum point but also the higher closing delay variations.

Figure 4A:
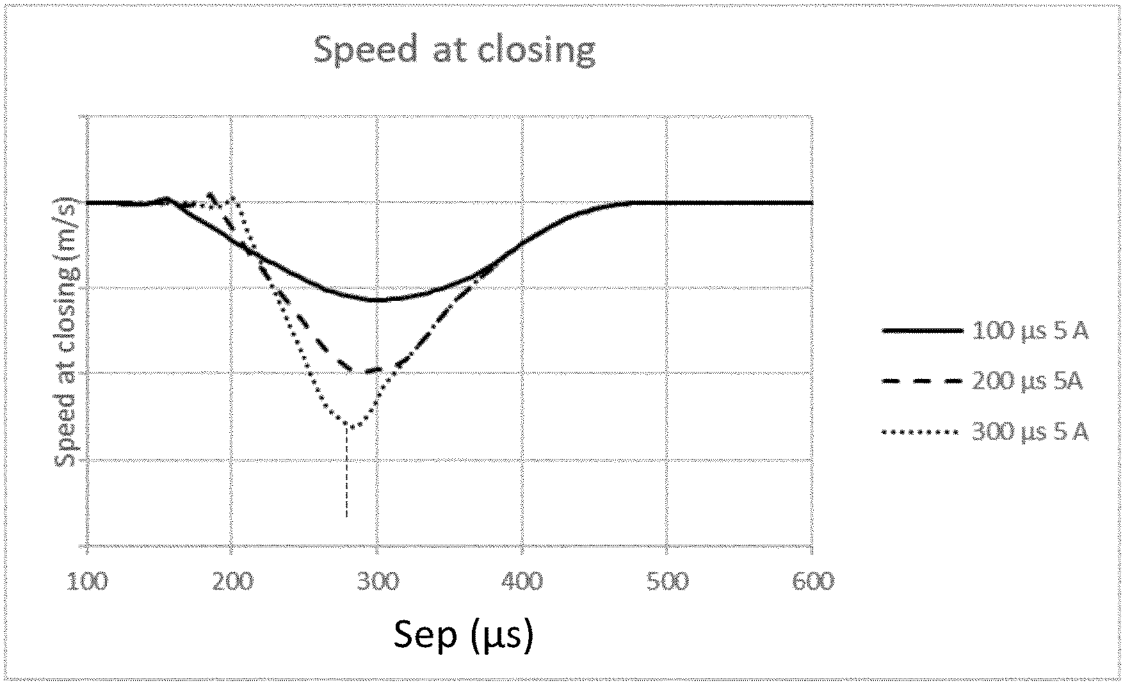
FIG. 4: represents graphs of (A) needle closing speed vs. separation period and (B) closing time vs. separation period.
Figure 4B:
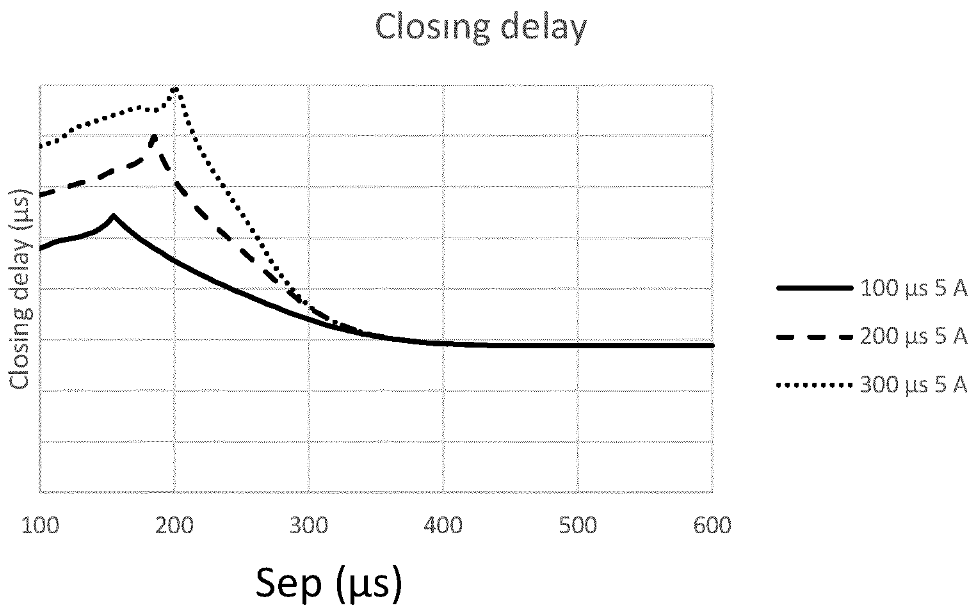

This is confirmed by FIG. 4A, B which show, for three different levels of braking pulse energy, the resulting impact on needle speed at closing (A) and on closing delay (B).

We can notice that at optimum point (separation giving minimum speed) closing delay has increased compared to the minimum value (where no braking pulse is present or high separation).

As will be understood by those skilled in the art, a tradeoff is thus to be made to optimize the braking pulse energy.

Advantageously, the braking pulse duration and current level are optimized to reach a target closing speed for a given working point, with lowest closing delay increase and lowest energy.

The invention claimed is:

1. A method of controlling fuel injection in an internal combustion engine having at least one cylinder with an associated electrically actuated fuel injector for performing injection events, wherein a drive signal is applied to the fuel injector in order to actuate a needle therein that controls flow through a valve seat;

wherein the drive signal comprises a fueling pulse adapted to move and/or hold the needle to an open position relative to a valve seat, followed by a braking pulse adapted to slow down the needle moving towards a closed position relative to the valve seat, the braking pulse being separated from the fueling pulse by a separation period;

wherein the braking pulse is configured to end at a timing that substantially matches the moment when the needle reaches the closed position, the braking pulse ending within ±50 μs of the moment when the needle reaches the closed position.

2. The method according to claim 1, wherein the separation period is calibrated on the basis of a nominal closing time or a learned closing time of the needle.

3. The method according to claim 2, wherein the needle closing time is learned for the respective fuel injector during engine operation.

4. The method according to claim 3, wherein the needle closing time is derived from the injector voltage trace.

5. The method according to claim 2, wherein the needle closing time is learned during a learning mode, during which the drive signal does not include a braking pulse.

6. The method according to claim 1, wherein the braking pulse has a predetermined energy calibrated in function of a respective engine operating point.

7. The method according to claim 6, wherein the braking pulse has a predetermined duration read from a map in function of fuel pressure and flow rate.

8. The method according to claim 6, wherein the braking pulse has a predetermined current intensity read from a map in function of fuel pressure.

9. The method according to claim 1, wherein the separation period is read from a map in function of fuel pressure and flow rate.

10. The method according to claim 2, wherein the needle closing time is read from a map in function of fuel pressure and flow rate.

11. The method according to claim 6, wherein the braking pulse energy is determined by optimizing to reach a desired target closing speed for a respective operating point with the lowest increase of needle closing time and lowest energy.

12. The method according to claim 1, wherein the duration of the separation period is determined by a positioning routine comprising:

for a given operating point, performing a plurality of injection events while increasing the separation period; and selecting the optimal value of separation period based on the analysis of the voltage trace corresponding to each drive pulse.

13. The method according to claim 12, wherein a characteristic parameter is derived from the voltage trace and used for selecting the optimal value of separation period, the characteristic parameter reflecting the needle closing time.

14. The method according to claim 12, wherein the optimal separation period is determined by comparison to a threshold.

15. The method according to claim 13, wherein the characteristic parameter is a glitch magnitude.

16. The method according to claim 15, wherein the optimal separation period is determined based on a drop in glitch magnitude.

17. A fuel injection control unit configured to perform the steps of the method of controlling fuel injection as claimed in claim 1.

* * * * *